(12) United States Patent
Ferris

(10) Patent No.: US 9,262,498 B2
(45) Date of Patent: Feb. 16, 2016

(54) GENERATING OPTIMIZED HOST PLACEMENT OF DATA PAYLOAD IN CLOUD-BASED STORAGE NETWORK

(75) Inventor: James Michael Ferris, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 517 days.

(21) Appl. No.: 13/118,075

(22) Filed: May 27, 2011

(65) Prior Publication Data
US 2012/0303740 A1 Nov. 29, 2012

(51) Int. Cl.
G06F 17/30 (2006.01)
H04L 29/06 (2006.01)
H04L 29/08 (2006.01)

(52) U.S. Cl.
CPC .... *G06F 17/30584* (2013.01); *G06F 17/30194* (2013.01); *H04L 29/06* (2013.01); *H04L 29/08072* (2013.01)

(58) Field of Classification Search
CPC ........................... H04L 29/06; H04L 29/08072
USPC ............................ 709/220, 227, 225; 711/118
See application file for complete search history.

(56) References Cited

U.S. PATENT DOCUMENTS

| | | | | |
|---|---|---|---|---|
| 8,112,471 | B2 * | 2/2012 | Wei et al. | 709/202 |
| 8,407,190 | B2 * | 3/2013 | Prahlad et al. | 707/692 |
| 8,701,155 | B2 * | 4/2014 | Stuedi | G06F 17/30017 726/1 |
| 2006/0190716 | A1 * | 8/2006 | Miller | 713/150 |
| 2011/0047380 | A1 * | 2/2011 | Miller | 713/168 |
| 2011/0137973 | A1 * | 6/2011 | Wei et al. | 709/202 |
| 2011/0208958 | A1 * | 8/2011 | Stuedi | G06F 17/30017 713/150 |
| 2012/0089579 | A1 * | 4/2012 | Ranade et al. | 707/693 |
| 2012/0089781 | A1 * | 4/2012 | Ranade et al. | 711/118 |
| 2012/0324070 | A1 * | 12/2012 | Campion et al. | 709/223 |

OTHER PUBLICATIONS

Jeffrey Darcy, "Systems and Methods for Cloud-Based Directory System Based on Hashed Values of Parent and Child Storage Locations," U.S. Appl. No. 12/893,612, filed Sep. 29, 2010.
Jeffrey Darcy, "Systems and Methods for Searching a Cloud-Based Distributed Storage Resources Using a Set of Expandable Probes", U.S. Appl. No. 12/893,737, filed Sep. 29, 2010.
Jeffrey Darcy, "Systems and Methods for Monitoring Files in Cloud-Based Networks", U.S. Appl. No. 12/893,388, filed Sep. 29, 2010.

(Continued)

*Primary Examiner* — Khanh Dinh
(74) *Attorney, Agent, or Firm* — Lowenstein Sandler LLP

(57) ABSTRACT

Embodiments relate to systems and methods for generating optimized host placement of data payload in a cloud-based storage network. In aspects, a user can maintain a user premise network including servers, clients, local area networks, data stores, and/or other network assets. An administrator or other user of the premise network may wish to extract data from the premise network and transfer that data payload to a set of host storage clouds to leverage cost, redundancy, consolidation, or other cloud advantages. The placement tool can evaluate potential target cloud-based data stores based on various or multiple parameters for the hosting features offered by different cloud providers. The tool can generate a determination of the target host or hosts which can provide the best-matched or optimized data hosting facilities or services for the user's data payload in the cloud. The selected target(s) can be based on cost, capacity, security, compatibility, or other parameters or specifications, which can be user-specified or user-weighted.

18 Claims, 8 Drawing Sheets

(56) References Cited

OTHER PUBLICATIONS

Jeffrey Darcy, "Systems and Methods for Dynamically Replicating Data Objects Within a Storage Network", U.S. Appl. No. 12/872,022, filed Aug. 31, 2010.

James Michael Ferris, "Systems and Methods for Stage Data Migration Between Data Sources and Cloud-Based Storage Network", U.S. Appl. No. 13/037,183, filed Feb. 28, 2011.

James Michael Ferris, "Systems and Methods for De-Populating Cloud Data Storage", U.S. Appl. No. 13/036,977, filed Feb. 28, 2011.

James Michael Ferris, "Systems and Methods for Migrating Data Amoung Cloud-Based Storage Networks Via a Data Distribution Service", U.S. Appl. No. 13/037,215, filed Feb. 28, 2011.

James Michael Ferris, "Systems and Methods for Generating a Selection of Cloud Data Distribution Service from Alternative Providers for Staging Data to Host Clouds", U.S. Appl. No. 13/037,148, filed Feb. 28, 2011.

James Michael Ferris, "Systems and Methods for Establishing Upload Channels to a Cloud Data Distribution Service", U.S. Appl. No. 13/037,230, filed Feb. 28, 2011.

James Michael Ferris, "Methods and Systems to Automatically Extract and Transport Data Associated with Workload Migrations to Cloud Networks", U.S. Appl. No. 13/116,599, filed May 26, 2011.

James Michael Ferris, "Systems and Methods for Cloud Data Deployment Based on Preferential and/or Existing Subscription Relationships", U.S. Appl. No. 13/117,331, filed May 27, 2011.

James Michael Ferris, "Methods and Systems for Data Compliance Management Associated with Cloud Migration Events", U.S. Appl. No. 13/118,123, filed May 27, 2011.

James Michael Ferris, "Systems and Methods for Determining Consistencies in Staged Replication Data to Improve Data Migration Efficiency in Cloud Based Networks", U.S. Appl. No. 13/117,235, filed May 27, 2011.

* cited by examiner

GENERATING OPTIMIZED HOST PLACEMENT OF DATA PAYLOAD IN CLOUD-BASED STORAGE NETWORK

FIELD

The invention relates generally to systems and methods for generating an optimized host placement of a data payload in a cloud-based storage network, and more particularly, to platforms and techniques for assembling a data payload extracted from an on-premise network or other source in a data distribution service connected to a set of host storage clouds via high-bandwidth connections, and generate or identify one or more target clouds in that set representing the optimized or best-available hosting resource for that data payload based on a user's specified data hosting parameters.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent clouds to support the user's cloud deployment. That user may further instantiate and use multiple applications or other software or services inside or across multiple of those cloud boundaries, and those resources may be used or consumed by multiple or differing end-user groups in those different cloud networks.

In terms of data deployment and migration to the cloud, in cases, an administrator or other user may wish to consider transporting a set of data from a premise-based network into cloud-hosted storage, for instance to leverage the cost, consolidation, management tools, and/or other features or advantages of the cloud. In an unmodified or unaided cloud storage platform, relatively large-scale storage resources may be available for users wishing to upload their data assets into the cloud, but without any special or enhanced set of connections into the host storage clouds. In the case of relatively large-scale premise data stores, such as those maintained, merely for instance, by hospitals, government agencies, financial institutions, or other entities, the amount of data that needs to be transported may be in the range of terabytes, petabytes, or more. In the case of those comparatively large-scale data installations, an attempt to migrate the data over public Internet connections, such as packet-switched TCP/IP (transfer control protocol/Internet protocol) or FTP (file transfer protocol) connections, the delivery of the data payload could require days or weeks of time. For many organizations, that type of transfer delay may be impractical or impossible. In addition, the relatively narrow-bandwidth connections available over the public Internet may not be secure, and for sensitive data or applications, the use of such connections may also not be a valid or practical option. Narrow-bandwidth connections into a host storage cloud may also not allow for data management services such as error correction, in-flight encryption, or other security or management options.

Moreover, in some cloud-based storage networks, after completion of the transport and mounting of the data payload of interest to an intermediate distribution service, there may be multiple potential target hosts to which the data payload may be moved and hosted. In aspects, without any additional decision logic or hosting or management tools, the user could be forced to manually review all available target storage clouds, and manually inspect or consider those potential hosting sites to determine which cloud or clouds may meet their criteria of interest, and ultimately select a cloud or clouds they wish to host their data payload.

It may be desirable to provide systems and methods for generating an optimized host placement of a data payload in a cloud-based storage network, in which the interrogation, matching, rating and selection of one or more host storage clouds can be conducted on an automatic or optimized basis, in which all available cloud storage options can be discovered and evaluated against a users set of selected storage criteria or parameters using placement tools and logic, to select or identify an optimized or best-available set of host storage clouds in which to place the users desired data payload.

DESCRIPTION

Figure 1:
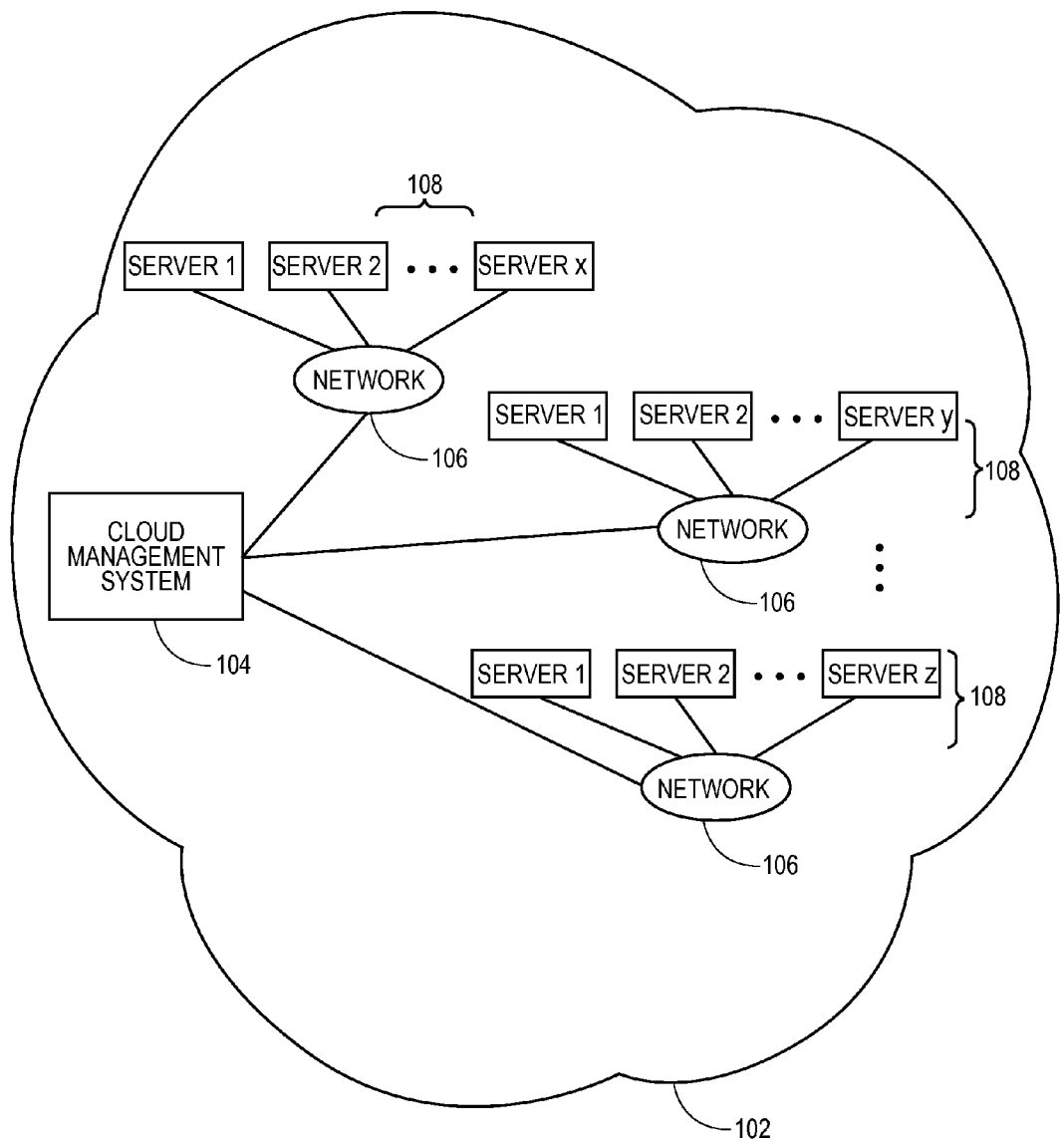
FIG. 1 illustrates an overall cloud system architecture in which various aspects of systems and methods for generating an optimized host placement of data payload in a cloud-based storage network can be practiced, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
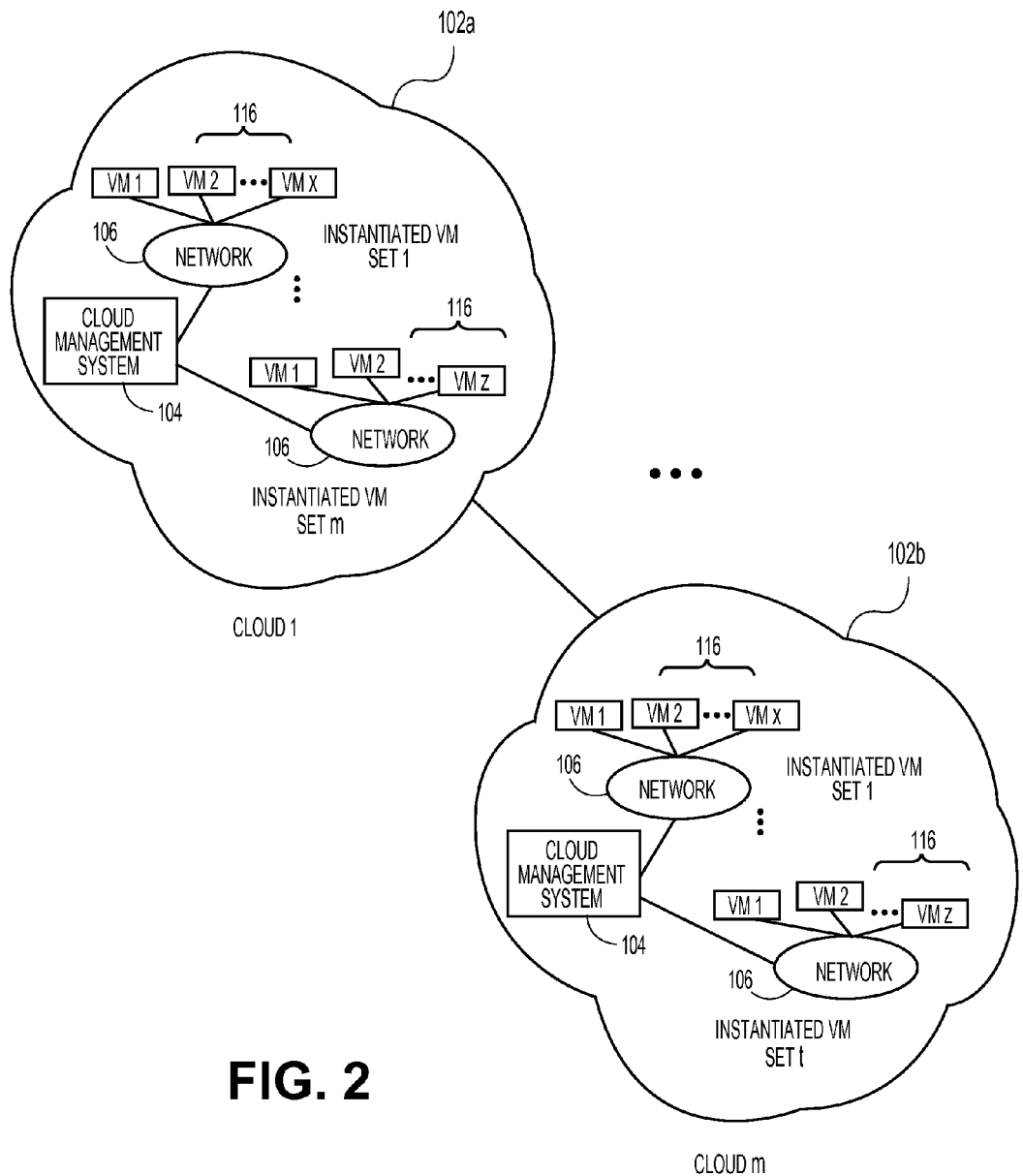
FIG. 2 illustrates an overall cloud system architecture in which various aspects of systems and methods for generating an optimized host placement of a data payload in a cloud-based storage network can be practiced, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

In aspects, the cloud management system 104 and/or other logic or service that manages, configures, and tracks cloud activity can be configured to interact with other sites, platforms, engines, servers, and/or associated services that are configured to organize and manage the transport and delivery of existing data stores from on-premise databases or other sources, and stage that data to data storage resources at, near, co-hosted, or otherwise in geographic proximity to a set of host storage clouds in which that data payload will be placed and stored. In aspects, the cloud distribution data service (which may be referred to as "CDD", "CDD service," "data delivery service," or other references herein) can be located at the network edge to either or both of the premise data sources, and/or the set of host storage clouds. In aspects, this staging or staggering of potentially large-scale or very large-scale data stores can permit the connection between the data source(s), intermediate or staged data stores, and/or the host cloud data stores using dedicated and/or high-bandwidth lines, channels, or connections to permit the efficient and timely porting of that data to a host storage cloud or clouds of the user's choice. In aspects, the data payload or portions thereof can be located, extracted and transmitted as an image or copy of the subject data, with the original cloud-hosted being preserved in the set of host storage clouds. In aspects, the data payload and/or portions thereof can be located, extracted, and transmitted without leaving the original data stored in the set of host storage clouds, such as by deleting that data upon reading-out, or using other techniques.

Figure 3:
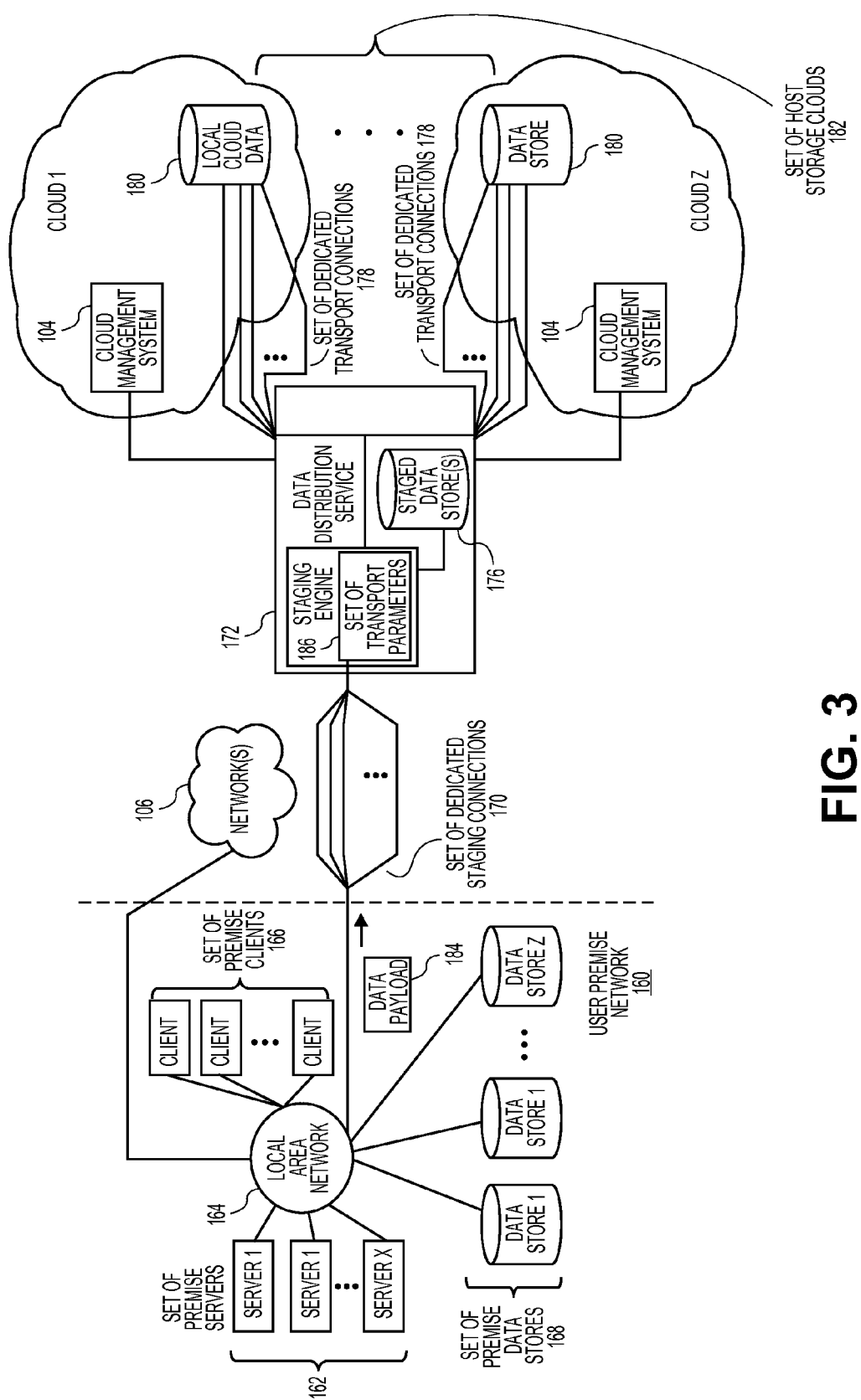
FIG. 3 illustrates a network configuration in which a data distribution service can be established between a premise network and host storage cloud, according to various embodiments.

In those regards, FIG. 3 illustrates a network implementation in which, in various cases, an administrator, owner, operator, and/or other user of a premise network 160 may wish to consider identifying, collecting, and migrating or transporting their databases, data files, and/or other data assets to a set of host storage clouds 182. In aspects and merely illustratively, the premise network 160 can contain or include on-premise, bare-metal, and/or other virtual or physical assets including a set of premise servers 162, a set of premise clients 166, one or more local area networks (LANs) 164 such as an Ethernet™ or Wifi™ network, a virtual private network (VPN), and/or other networks or connection topologies. The premise network 160 can include or interface to one or more networks 106, such as the public Internet and/or other public or private networks.

The premise network 160 can likewise include a set of premise data stores 168, such as one or more databases, data stores, servers, redundant arrays of inexpensive disks (RAID) installations, optical or solid-state storage or devices, and/or other data storage repositories, resources, or assets. In aspects, the set of premise data stores 168 can store different types of data, including, for example, technical, medical, financial, scientific, and/or other data. The data hosted or stored in the set of premise data stores 168 can comprise significantly or substantially large-scale data, for example data or files comprising terabytes or other amounts of data. For instance, the administrator, owner, operator, and/or other user of a corporation, hospital, educational institution, government body, and/or other entity may collect and maintain a set of data in a set of premise data stores 168 such as local databases, data centers, database files and/or engines, repositories, and/or other data assets, services, and/or other storage sites of resources. In cases, the set of premise data stores 168 can host and store a significant or substantial amount of data, such as terabytes, petabytes, exabytes, yottabytes, and/or other amounts of data. In aspects, the administrator, owner, operator, and/or other user responsible for hosting and/or maintaining that data in the set of premise data stores 168 may, for various reasons, wish to migrate some or all of that constituent data to one or more local cloud data stores 180 in the set of host storage clouds 182, such as to leverage cost, maintenance, capacity, security, and/or other advantages or factors available in the set of host storage clouds 182.

In aspects, it can be the case that if the owner, administrator, and/or other user of the user premise network 160 attempted to transport a significant amount of the data stored in the set of premise data stores 168 via one or more networks 106 such as the Internet in an unmanaged fashion, the comparatively low bandwidth or lack of reliability in the packet-switched public Internet could render the data transfer difficult, impractical, unfeasible, or impossible due to the limitations of those types of channels or connections. The upload of terabytes or other amounts of data over public Internet or similar connections could require days of time or more, and data integrity or reliability issues could also affect the effectiveness of data migration attempted in that manner.

According to aspects, systems and methods for generating optimized host placement of data payload in a cloud-based storage network according to the present teachings can be deployed to assist in reducing, avoiding, or eliminating those and other types of performance degradations and other factors having a potential impact on the transport of data from on-premise and/or other sources to the set of host storage clouds 182 and/or other cloud-based storage assets, services, or resources. In implementations of the present teachings, a data distribution service 172 can accordingly be established or deployed as an independent service or access point, available publicly or privately to potential subscribers to the set of host storage clouds 182, to condition, prepare, receive, and stage incoming data payloads or data sets for delivery to an eventual cloud storage host, using enhanced, dedicated, and/or otherwise managed connections to reduce data transport time, to improve transfer reliability and/or security, and/or to provide other factors or benefits. In aspects, the data distribution service 172 can establish or maintain physical points of presence (PoPs) and/or other connections to one or more networks 106, such as the Internet and/or other public or private networks, through which users or potential users can connect to the data distribution service 172 and its associated resources, logic, and services. According to aspects, the data distribution service 172 can host or execute a staging engine 174 that can contain software application, operating system, and/or other logic or resources to manage the transport and delivery of a data payload 184 from the set of premise data stores 168 and/or other sources to a set of host storage clouds 182. In aspects, the data distribution service 172 can be configured to communicate directly or indirectly with the cloud management system 104 of each of the set of host storage clouds 182, for instance via the Internet and/or other public or private networks or connections. In aspects, the data distribution service 172 can also maintain a set of staged data stores 176, such as databases, data stores, servers, and/or other data assets or resources with which to store and stage the data payload 184 for migration into one or more local cloud data stores 180 hosted in the set of host storage clouds 182. In aspects, each cloud in the set of host storage clouds 182 can host one or multiple local cloud data stores 180.

According to implementations of the present teachings in certain regards, the data distribution service 172 can operate to manage, organize, and/or enhance or optimize the transfer of the data payload 184 from the set of premise data stores 168 and/or other sources by staggering, staging, pre-staging, conditioning, and/or otherwise manipulating and administering the transfer of the data payload 184 to the set of staged data stores 176 via sets of selectable and/or configurable channels or connections. In aspects, those channels or connections can be or include a set of dedicated staging connections 170 that connect the user premise network 160 to the data distribution service 172 and the set of staged data stores 176. In aspects, the set of dedicated staging connections 170 can be or include any one or more of asynchronous transfer mode (ATM) networks or connections, wide area networks (WANs) or connections, metropolitan area networks (MANs) or connections, fiber optical connections such as synchronous optical networking (SONET) or synchronous digital hierarchy (SDH) connections, wireless connections, cable or wireline connections, virtual private networks (VPNs) or connections, and/or other channels or connections. In aspects, the connections in the set of dedicated staging connections 170 can be or include channels or connections can having a relatively high-capacity bandwidth or service level, such as for instance tens of megabytes per second, hundreds of megabytes per second, gigabytes per second, tens of gigabytes per second, hundreds of gigabytes per second, terabytes per second, and/or other data transfer rates or bandwidth ratings or capacities. In aspects, any one or more of the connections or channels in the set of dedicated staging connections 170 can comprise connections which are leased by a user on a temporary, demand-triggered, long-term, and/or other basis. And one or more of the connections or channels in the set of dedicated staging connections 170 can be or include permanent or dedicated channels, line, and/or connections, dynamically routed or configured channels or connections, and/or other channels or connections.

In aspects, the administrator, owner, operator, and/or other user of the user premise network 160 can specify a set of conditions, criteria, and/or other parameters to govern the transport of the data payload 184 during delivery to the data distribution service 172 and/or to the eventual set of host storage clouds 182, which information can be stored or encoded in a set of transport parameters 186, which can be stored in the staging engine 174 and/or other locations or stores. The set of transport parameters 186 can, for instance, specify a total amount of data to be include in the data payload 184 for delivery to the data distribution service 172, as well as a schedule over which or time by which the administrator, owner, operator, and/or other user wishes to conduct and complete the migration of the data payload 184 to the data distribution service 172. The set of transport parameters 186 can likewise include cost specifications, for instance, in cases where the cost of leasing or using any of the set of dedicated staging connections 170 is selectable or variable. The set of transport parameters 186 can also include further configuration parameters, such as any security or redundancy protocols or standards that the administrator, owner, operator, and/or other user wishes to apply to the transport of the data payload to the data distribution service 172, user access controls to the data payload 184 before or after transport has been initiated or completed. Other parameters, configuration settings, commands, scripts, and/or other criteria, variables, or conditions can be specified or indicated in the set of transport parameters 186.

As a merely illustrative example, the administrator, owner, operator, and/or other user can enter or encode the set of transport parameters 186 to indicate that a data transport event is desired to migrate the data payload 184 from the user premise network 160 under criteria that 1,000 terabytes of data is to be transported by an ending time of 12:00 midnight on a specified data, at an average cost of not more than $0.25 per megabyte and with the data payload 184 encrypted using the Data Encryption Standard (DES) and/or other encryption or security protocol, and with the data payload 184 to be stored in the set of staged data stores 176 of the data distribution service 172 in XML (extensible markup language) or other format. The set of transport parameters 186 can be selected, entered, and/or otherwise transmitted from the user premise network 160 or other site to the data distribution service 172, for instance via a selector tool, Web browser, and/or other application or interface. The set of transport parameters 186 can, in aspects, in whole or part specify the set of dedicated staging connections 170 to be used for delivery of the data payload 184 and/or associated information to the data distribution service 172, for instance via manual selection or input received from the administrator, owner, operator, and/or other user.

In aspects, the data payload 184 and/or associated information can be migrated or transported partly or entirely via the set of dedicated staging connections 170. For instance, in cases, the administrator, owner, operator, and/or other user may transmit some of the data payload 184 and/or associated information via the one or more networks, in addition to the set of dedicated staging connections 170. For example, configuration commands, the set of transport parameters 186 or portions of or updates to the set of transport parameters 180, can be transmitted via the one or more networks 106, for instance via the public Internet, since in aspects comparatively higher-bandwidth connections may not be necessary to transmit relatively small amounts of commands and/or data or elements of the data. In cases, the one or more networks 106 can in addition or instead transport at least a portion of the data payload 184, for instance, to transmit supplemental data or attributes whose delivery target time is not immediate or a high priority. Other combinations of the one or more networks 106, the set of dedicated staging connections 170, other networks or connections, and/or combinations thereof can be used.

In aspects, after transport of the data payload 184 to the set of staged data stores 176 of the data distribution service 172 has been completed, the data distribution service 172 can finalize the installation, storage, and/or hosting of the data payload 184 and/or associated information in the one or more local cloud data stores 180 before initiating activities related to further transport of the data payload 184 to the one or more local cloud data stores 180 of one or more of the set of local host storage clouds 182. The data distribution service 172 can store, host, and maintain the data payload 184 in the set of staged data stores 176 for temporary, short-term, and/or longer or other periods, depending on the set of transfer parameters 186 and/or other factors. For instance, the staging engine 174 of the data distribution service 172 can determine that the administrator, owner, operator, and/or other user has specified or requested that the transfer of the data payload 184 into the one or more local cloud data stores 180 of one or more of the set of local host storage clouds 182 be initiated by 9:00 p.m. on a certain date. To satisfy that scheduling criterion, the staging engine 174 can identify the size and/or type of data in the data payload 184, analyze or estimate the bandwidth available in the set of dedicated staging connections 170, and set a target delivery completion time of 11:00 p.m. on the specified delivery date, taking into account the interval of time that will be necessary to transport the data payload 184 over the available bandwidth of the selected channels in the set of dedicated staging connections 170 to complete transfer of the data payload 184 by 11:00 p.m. on that scheduled date. If the transport process proceeds to complete by the calculated completion time of 11:00 p.m. on that date, the data of the data payload 184 and/or any associated information can accordingly reside in the set of staged data stores 176 of the data distribution service 172 for one hour before the staging engine 174 initiates the further or next-stage migration or transport of the data payload 184 to the one or more local cloud data stores 180 of one or more of the set of local host storage clouds 182. The set of staged data stores 176 of the data distribution service 172 can host the data payload 184 and/or associated information for lesser or greater amounts of times, for instance, for periods of minutes, hours, days, weeks, months, and/or other periods or intervals, depending on the set of transfer parameters 186 and/or other factors. For instance, in an illustrative implementation involving payload data 184 including enterprise resource planning (ERP) data related to a chemical or automotive factory, the manufacturing data, materials deliveries and costs, factory repair or maintenance events or schedules, and/or other data may be tracked, stored, and updated on a monthly cycle. In those or other implementations, the administrator, owner, operator, and/or other user may specify that the data payload 184 encapsulating that ERP and/or other data can or should be migrated over a period of 30 days and/or before the next regular update cycle, in which case the data distribution service 172 may determine that the data payload 184 can be extracted to the data distribution service 172 over a period of 30 days, for instance so as to use a comparatively lower amount of bandwidth in the set of dedicated staging connections 170 and thereby incur less connection leasing costs. In cases where the set of staged data stores 176 of the data distribution service 172 stores, hosts, and/or maintains the data payload 184 over significant intervals of time, such as days or weeks of time, and/or other intervals or periods, the data distribution service 172 can also apply or enforce data conditioning or maintenance standards or procedures on the data payload 184 or other information. For example, in cases where the data payload 184 includes medical information, the data distribution service 172 can apply user access controls such as username/password authentication and/or data encryption, for instance to satisfy the requirements of the Health Insurance Portability and Accountability Act (HIPPA), the requirements of the Sarbanes-Oxley Act (SOX), or other regulatory or compliance stipulations or requirements. Other compliance, management, and/or security protocols can be applied to the data payload 184 and/or other information stored in the set of staged data stores 176 of the data distribution service 172, regardless of the duration of time that information is staged in the data distribution service 172. For instance, during the period that the data payload 184 resides or is hosted in the data distribution service 172, the data distribution service 172 can also communicate with the user premise network 160 to interrogate that source network for any incremental or other updates to the data payload 184, and incorporate those updates into the data payload 184 stored in the set of staged data stores 176 of the data distribution service 172. Other data conditioning or processing can be performed on the data payload 184 while hosted or stored in the set of staged data stores 176 of the data distribution service 172.

In aspects, the data distribution service 172 can be installed, configured, and/or located in geographic proximity to the set of host storage clouds 182, the one or more local cloud data stores 180, and/or other network elements or sites. As used or described in this application, in aspects, locations within geographic proximity to each other can be or include locations or sites located within the same city or metropolitan area, and/or within the same general region, such as within a state in the U.S. and/or a multi-state region generally recognized as constituting a cohesive geographic region, such as, merely for example, the New York-New Jersey-Connecticut tri-state area, and/or others. In aspects, locations within geographic proximity to each other can also or instead be or include areas or regions within which direct, continuous, connectable, configurable, leasable, primary, and/or otherwise uninterrupted or unmediated physical or wireless connections are available to establish communications links between two or more network points, sites, and/or entities within a geographic region, section, and/or area. In aspects, network sites, points including physical points of presence (PoPs), and/or other elements can be considered to be within geographic proximity to each other is those sites or points can be connected directly or essentially directly via comparatively high-bandwidth channels or connections, and/or without resorting to connections via the public Internet. For example, network sites, points including physical points of presence (PoPs), and/or other elements can be considered to be within geographic proximity to each other if those sites, points, and/or other elements can be connected directly or essentially directly via one or more wide area networks (WANs), metropolitan area networks (MANs), optical connections such as synchronous optical network (SONET) connections, and/or other comparatively high-bandwidth channels or connections, as will be understood by persons skilled in the art. While in aspects network sites, points including physical points of presence (PoPs), and/or other elements can be considered as being within geographic proximity based on various physical, functional, and/or logical factors, in aspects, and purely illustratively, network sites, points including physical points of presence (PoPs), and/or other elements that can be classified or considered as being within geographic proximity can be located within distances of miles, tens of miles, hundreds of miles, and/or lesser or greater distances of each other. Other factors, parameters, criteria, and/or considerations can be used to determine geographic proximity between network sites, points including physical points of presence (PoPs), and/or other elements as described herein.

Upon meeting, reaching, and/or otherwise satisfying the scheduled time, criteria, and/or conditions to initiate the further transfer of the data payload 184 and/or associated information to the set of host storage clouds 182, the data distribution service 172 and/or other logic or service can begin the processing to migrate that data or information to the one or more local cloud data stores 180 of one or more clouds in the set of host storage clouds 182. In aspects, the delivery of the data payload 184 and/or associated information to the set of host storage clouds 182 can be initiated at a scheduled time, such as a time specified in the set of transport parameters 186 and/or other commands or configuration data. In aspects, the delivery of the data payload 184 and/or associated information to the set of host storage clouds 182 can be initiated on an event-triggered basis, such as one hour or one day after completion of the transport of the data payload 184 to the data distribution service 172. In aspects, the delivery of the data payload 184 and/or associated information to the set of host storage clouds 182 can also or instead be initiated by manual selection or command, for instance, by a selection or command inputted by the administrator, owner, operator, and/or other user. Other conditions, commands, schedules, events, and/or criteria can be used to identify a time at which to begin, pause, continue, and/or otherwise deliver the data payload 184 and/or associated information from the data distribution service 172 to the one or more local cloud data stores 180 of one or more clouds in the set of host storage clouds 182.

In aspects, the data payload 184 and/or other information can be transported or transmitted from the data distribution service 172 to the set of host storage clouds 182 via a set of dedicated transport connections 178. In aspects, the set of dedicated transport connections 178 an connect the set of staged data stores 176 directly or indirectly to the one or more local cloud data stores 180 to migrate and install the data payload 184 and/or associated information in the one or more local cloud data stores 180. In aspects, the set of dedicated transport connections 178 can be or include connections or channels of the same general type or types as the set of dedicated staging connections 170, and/or can include additional, separate, and/or different channels or connections. In aspects, the set of staged data stores 176 can be located within geographic proximity or near-geographic proximity, in the senses noted herein, to one or more of the clouds in the set of host storage clouds 182 and/or the constituent elements of those clouds, including the cloud management system(s) 104 and/or one or more local cloud data stores 180. In aspects, the staging engine 174 and/or other logic or service can initiate and manage the transfer of the data payload 184 and/or image thereof stored or hosted in the set of staged data stores 176 to the one or more local cloud data stores 180 via the set of dedicated transport connections 178 on a scheduled, event-triggered, manually-specified, and/or other basis. The migration or transport of the data payload 184 and/or associated data can for instance be programmed to begin at a specified time on a specified date, and/or to begin upon the detection of specified events, such as validation of the data payload 184 and/or associated data using error correction, decryption, and/or other processing or protocols. In aspects, the migration or transport of the data payload 184 and/or associated data can be initiated by receipt of a command, input, and/or other signal from the administrator, owner, operator, and/or other user, for instance, received via a tool, interface, or browser operated by the admin in the user premise network 160 and/or other location or site.

After the transfer of the data payload 184 and/or other associated data has been initiated, the staging engine 174 and/or other logic or service can monitor the transport of that data while in-flight, for instance, to perform data validation of migrated data using for instance check-sum or other processing, encryption/decryption of the data while traversing the set of dedicated transport connections 178, and/or to perform other supervisory or monitoring tasks to ensure the integrity of the data being moved and the migration process. After the successful completion of all data transport, validation, security, and/or other processing required for migration of the data payload 184 and/or related information, the staging engine 174 can detect, confirm, and/or declare the completion of the transfer of the data payload 184 and/or associated information to the set of host storage clouds 182. In aspects, the staging engine 174, one or more cloud management system(s) 104, and/or other logic can store and/or encode the data payload 184 and/or associated information in the one or more local cloud data stores 180 in various formats or configurations, such as, for example, any one or more of a database including relational databases, an object-oriented data object such as an extensible markup language (XML)-based object, a table, tree, linked list, and/or other data object, format, file, and/or configuration. In aspects, the staging engine 174 can also perform any post-transfer activities that may be selected or required to complete the installation and storage of the data payload 184 and/or related information in the set of host storage clouds 182. In aspects, for instance, the staging engine 174 and/or other logic or service can communicate with the user premise network 160 to indicate that the data payload 184 and/or associated information has been safely and/or completely migrated to the data distribution service 172, upon which notification the user premise network 160 can perform other actions, such as to delete and/or archive the data of the data payload 184 from the set of premise data stores 168. Other actions can be taken by or in the user premise network 160.

For instance, upon completion of the data transport process, the staging engine 174 and/or other logic or service can likewise communicate with the cloud management system(s) 104 of one or more of the set of host storage clouds 182 to notify the one or more cloud management system(s) 104 of the installation and presence of the data payload 184 and/or associated data in the one or more local cloud data stores 180 of one or more of the clouds in the set of host storage clouds 182.

In aspects, after the successful or completed transport of the data payload 184 and/or associated information to the set of host storage clouds 182, the staging engine 174, cloud management system(s) 104, and/or other logic or service can for instance register the data payload 184 and/or associated data in the file storage system or systems used by the one or more cloud management system(s) 104 and/or set of host storage clouds 182. In aspects, registration of the data payload 184 and/or associated data in corresponding file storage system or systems maintained or operated by the one or more cloud management system(s) 104 and/or set of host storage clouds 182 can permit, for instance, virtual machines, operating systems, applications, and/or other software, services, and/or users of the set of host storage clouds 182 and/or other clouds or networks to access, read, retrieve, write, modify, and/or otherwise process the data payload 184 and/or associated information directly from or via the set of host storage clouds 182. In aspects, the staging engine 174 and/or other logic or service can at such times or at other times de-activate, release, and/or otherwise terminate some or all of the set of dedicated staging connections 170 and/or set of dedicated transport connections 178, as desired or scheduled.

Figure 4:
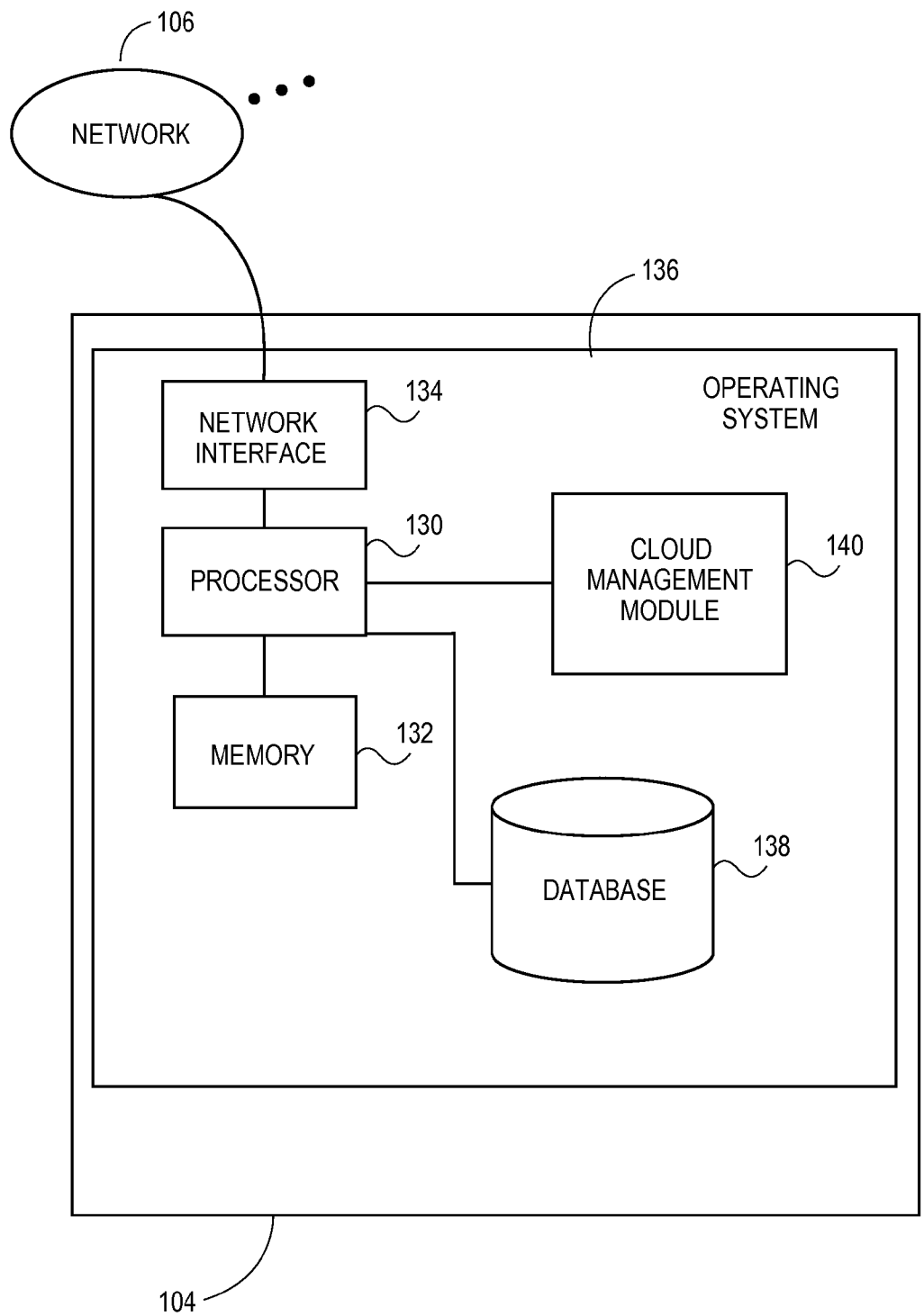
FIG. 4 illustrates an exemplary hardware configuration for a cloud management system that can support and maintain one or more cloud-based networks, according to various embodiments.

FIG. 4 illustrates an exemplary diagram of hardware and other resources that can be incorporated in a cloud management system 104 configured to communicate with the set of instantiated virtual machines 116, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, and a management engine 128, to execute control logic and control the operation of virtual machines and other resources in one or more clouds 102, the set of target clouds 152, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with workload management module 140, and/or other interfaces, applications, services, and/or logic. Other configurations of the cloud management system 104, associated network connections, and other hardware, software, and service resources are possible. It may be noted that in embodiments, the data distribution service 172 and/or components thereof such as the staging engine 174, and/or other hardware machines, platforms, or engines can comprise the same or similar resources as cloud management system 104, or can be configured with different hardware and software resources.

Figure 5:
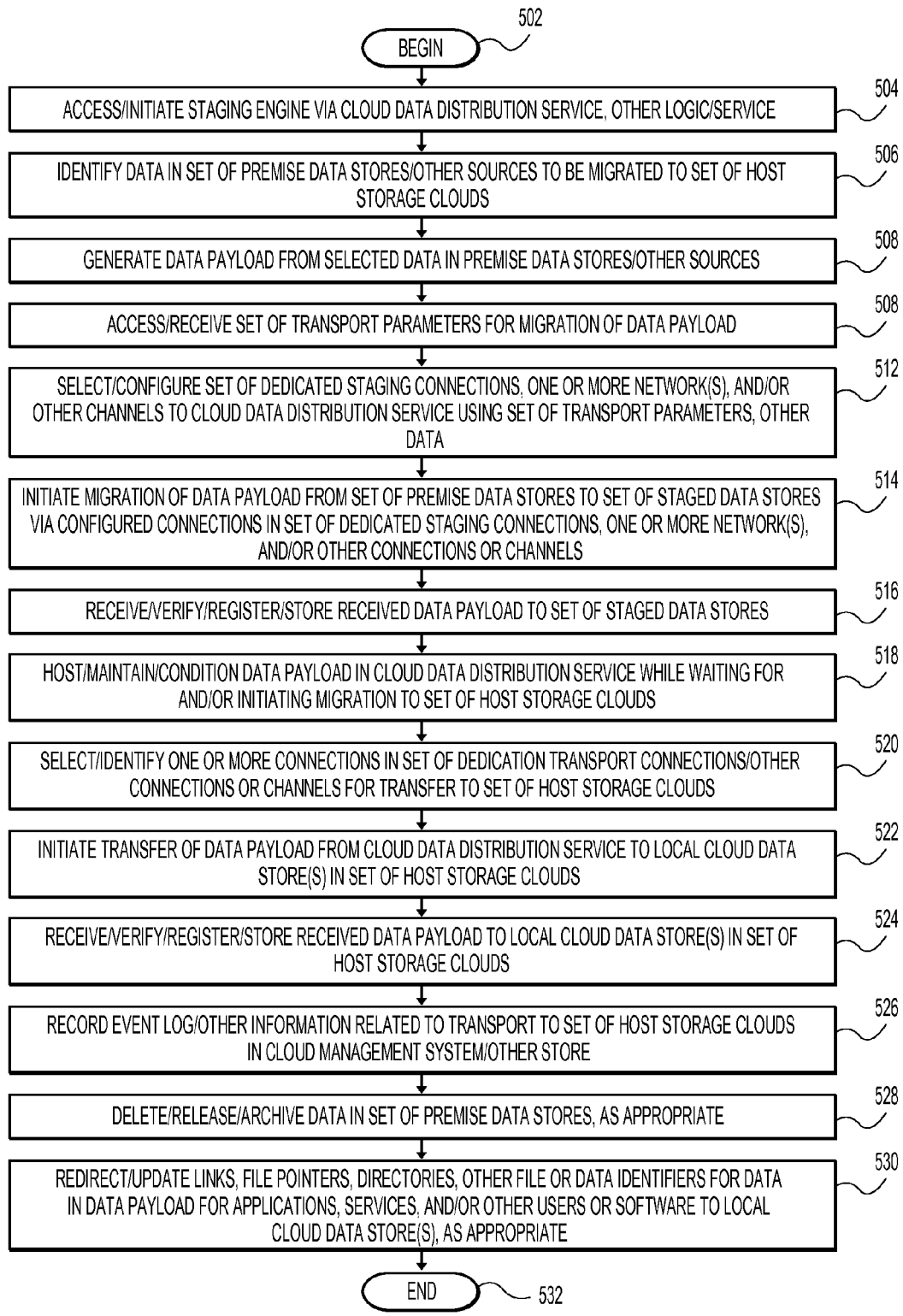
FIG. 5 illustrates a flowchart for data extracting, staging, and delivery processing via an intermediate or independent data delivery service, according to various embodiments.

FIG. 5 illustrates a flowchart of overall processing that can be used to identify, queue, stage, and/or otherwise transport or manage the data payload 184 and/or other data or information, according to various aspects of the present teachings. In 502, processing can begin. In 504, the staging engine 174 can be accessed and/or initiated, for instance via the data distribution service 172 and/or other logic or service. In 506, the staging engine 174 and/or other logic or service can identify the data in the set of premise data stores 168 and/or other data sources too be migrated to the set of host storage clouds 182. In aspects, the data in the set of premise data stores 168 to be migrated can be identified via user selection or input, automatically via applications or services, and/or using other techniques, inputs, or criteria. In 508, the data distribution service 172 and/or other logic or service can generate, discover, inventory, and/or otherwise identify the data to comprise the data payload 184 from the data selected in the set of premise data stores 168 and/or other data stores or sources. In 510, the staging engine 174 can access and/or receive the set of transport parameters 186 for the migration of the data payload 184. In aspects, the set of transport parameters 186 can specify, encode, store, and/or otherwise indicate the variables and/or configuration settings to be used to initiate, conduct, and manage the transport of the data payload 184 to the data distribution service 172 and/or to the eventual one or more local cloud data store(s) 180 in the set of host target clouds 182. In aspects, the set of transport parameters 186 can, for instance, include values for the size of the data to be extracted into the data payload 184, the format or encoding of the data to be extracted into the data payload 184, the language or other attributes of the data payload 184, the schedule by which the transport of the data payload 184 is to be conducted, selected and/or preferred connections by which the transport of the data payload 184 is to be conducted, user names or other identifiers for administrator, owner, operator, and/or other user to have access and/or management privileges during the transport of the data payload 184, and/or other parameters, settings, and/or variables.

In 512, the staging engine 174 and/or other logic or service can select, identify, and/or configure the set of dedicated staging connections 170, as well as one or more networks 106, and/or other channels or connections to the data distribution service 172 using the set of transport parameters 186 and/or other data. For example, the set of transport parameters 186 and/or other data can identify the vendors, carriers, and/or services or providers of the set of dedicated staging connections 170 and/or other channels or connections. For example, the set of transport parameters 186 and/or other data can identify the bandwidth capacities or classes of the set of dedicated staging connections 170 and/or other channels or connections, for example to permit the staging engine 174 and/or other logic or service to select channels or connections from amongst the set of dedicated staging connections 170 and/or other channels or connections that satisfy those or other specifications. In 514, the staging engine 174 and/or other logic or service can initiate the migration, transfer, or transport of the data payload 184 and/or associated information from the set of premise data stores 168 and/or other data stores or sources to the set of staged data stores 176 via the configured or selected connections in the set of dedicated staging connections 170, one or more networks 106, and/or other connections or channels. In aspects, the data transport can be initiated by transmitting one or more commands, messages, or signals from the staging engine 174 to the user premise network 160, the set of dedicated staging connections 170, and/or other network elements, sites, or services. In 516, the staging engine 174 and/or other logic or service can receive, verify, register, and/or store the received data payload 184 and/or associated information in or to the set of staged data stores 176 and/or other data stores or resources. In aspects, the set of staged data stores 176 can be or include data bases, server and/or storage farms, data centers, and/or other data hosting facilities co-hosted, co-located, located within geographic proximity to, and/or otherwise integrated with the data distribution service 172. In aspects, the staging engine 174 and/or other logic or service can, in instances, preserve or maintain the data format or configuration in the data payload 184 and/or associated information in the set of staged data stores 176 that was used in the storage of the same or similar data in the user premise network 160 and/or other data source. In aspects, the staging engine 174 and/or other logic or service can, in instances, also or instead update or modify the data format or configuration in the data payload 184 and/or associated information in the set of staged data stores 176 that was used in the storage of the same or similar data in the user premise network 160 and/or other data source.

In 518, the staging engine 174 and/or other logic or service can host, maintain, and/or otherwise manage or condition the data payload 184 and/or associated information in the data distribution service 172, while waiting for and/or initiating the migration of that data out of the data distribution service 172 to the set of host storage clouds 182. In aspects, the staging engine 174 and/or other logic or service can enforce privacy or access controls, such as to apply an access control list (ACL) to govern access to the data payload 184 and/or other associated information while stored or hosted in the data distribution service 172. In 520, the staging engine 174 and/or other logic or service can select and/or identify one or more connections in the set of dedicated transport connections 178 and/or other connections or channels for transfer of the data payload 184 and/or other associated information to the set of host storage clouds 182 and their associated storage resources. In aspects, the set of dedication transport connections 178 can be or include channels or connections of the same general type or types as the set of dedicated staging connections 170, and/or can be or include different or additional channels, connections, and/or services. In aspects, the set of dedicated transport connections 178 can be located within geographic proximity to some or all of the one or more local cloud data stores 180 of one, some, or all clouds in the set of host storage clouds 182, in the same senses described herein. In 522, the staging engine 174 and/or other logic or service can initiate the transport or transfer of the data payload 184 and/or associated information from the set of staged data stores 176 and/or other data sources of the data distribution service 172 to the one or more local cloud data stores 180 in or of the set of host storage clouds 182. For instance, the transport process can be initiated by or via a set of commands or instructions sent from the staging engine 174 to the cloud management system(s) 104 of the set of host storage clouds 182, by automatic initiation at scheduled times and/or based on programmed or predetermined conditions, and/or via other activation mechanisms. In 524, the one or more local cloud data stores 180 of one or more clouds in the set of host storage clouds 182 and/or other logic or service can receive, verify, register, encode, and/or otherwise store the data payload 184 and/or associated information. In aspects, for instance, the cloud management system(s) 104 of the corresponding clouds in the set of host storage clouds 182 can register or record the entry of the data payload 184 and/or associated information in a file storage system, such as a directory and/or other type of file or data record. In 526, the staging engine 174, one or more cloud management system(s) 104, and/or other logic or service can record an event log and/or other tracking information related to the transport of the data payload 184 and/or other information to the set of host storage clouds 182 in or to the cloud management system(s) 104 and/or other data store or stores. In 528, the staging engine 174, user premise network 160, cloud management system(s) 104, and/or other logic or service can delete, release, mark, de-activate, and/or otherwise archive or process the data corresponding to the data payload 184, and/or associated data, in or from the set of premise data stores 168. In 530, the staging engine 174, cloud management system(s) 104, and/or other logic or service can redirect and/or update one or more links, file names, file pointers, directories, and/or other file or data identifiers for data in the data payload 184 and/or associated information to indicate data storage locations in the one or more local cloud data stores 180 for the use of or access by applications, services, and/or other users or software. In 532, processing can repeat, return to a prior processing point, jump to a further processing point, or end.

Figure 6:
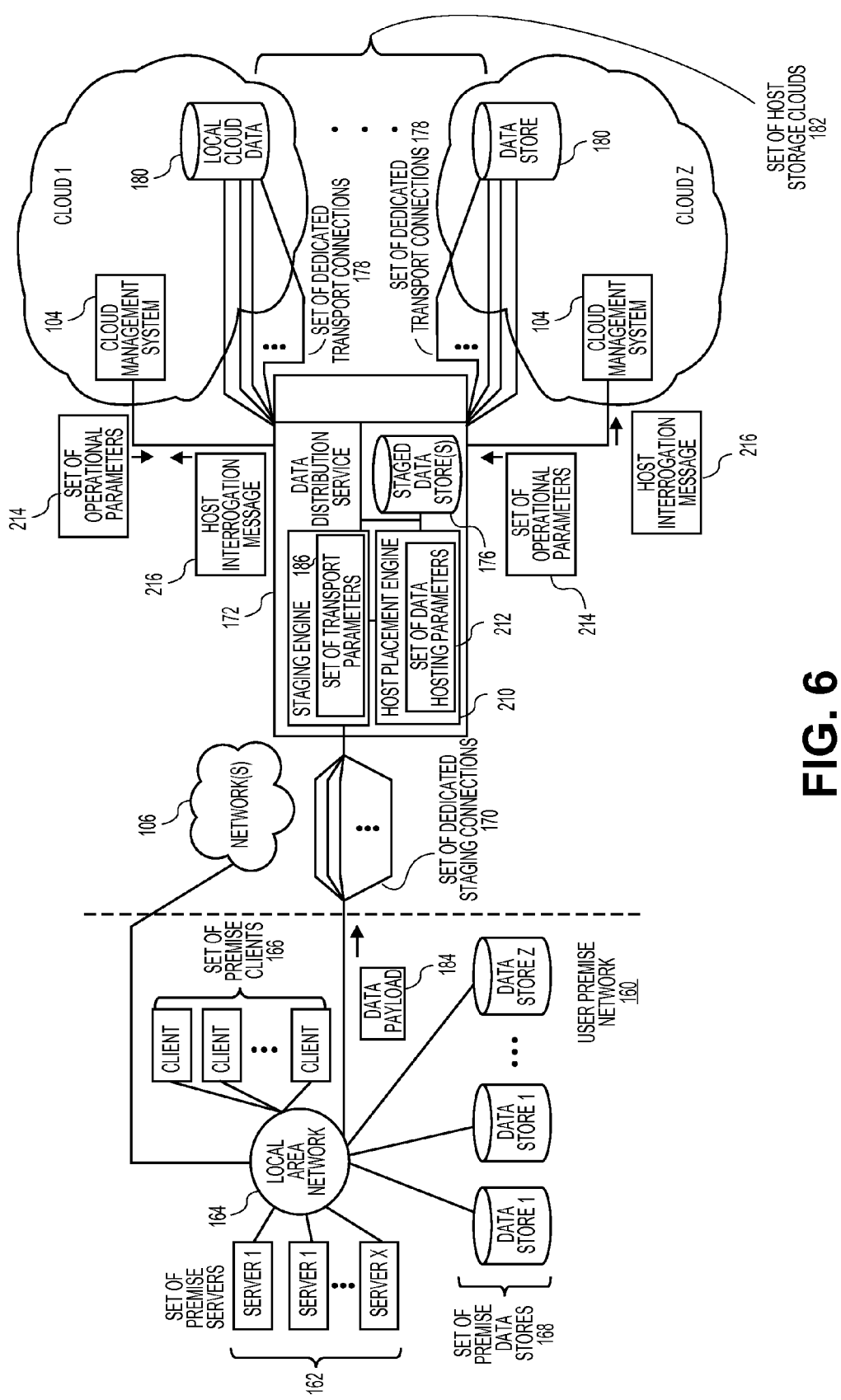
FIG. 6 illustrates a network configuration that can be used in systems and methods for generating an optimized host placement of a data payload in a cloud-based storage network, according to aspects

In aspects, and as for instance illustrated in FIG. 6, the data distribution service 172 can be configured to assist, automate, and guide the process of discovering, filtering, and identifying one or more cloud-based storage sites and/or providers that match, optimize, and/or most closely satisfy the user's desired preferences for the hosting and maintenance of the data payload 184. In embodiments as shown, the data distribution service 172 can be configured to host, initiate, and/or access host placement engine 210 comprising logic, services, software, data connections, storage, and/or other resources to interrogate, characterize, specify, and match the operational parameters of one or more clouds in the set of host storage clouds 182 to a user's specified or identified set of data hosting parameters 212 reflecting the capacity, cost, and/or other factors desired or required by the user to permit the hosting of the data payload 184 in a given cloud or clouds. In aspects, and as shown, the data distribution service 172 can be configured to host, access, and/or operate a host placement engine 210, which can interact with the staging engine 174, the set of transport parameters 186, the set of staged data stores 176, other local storage, and/or other resources of the data distribution service 172 to perform evaluation and management activities in identifying and selecting cloud-based storage hosts in the set of host storage clouds 182, and installing and managing the data payload 184 and/or other data in selected clouds or clouds within that host storage cloud population.

More particularly, in aspects, the transport and temporary, non-permanent, and/or other hosting of the user's data payload 184 can be established by prior activity which inserts and stores the data payload in the set of staged data stores 176, for instance using techniques and processes described herein. After the transport to and storage of the data payload in the data distribution service 172, at a scheduled time or other time, the user may wish to engage in a discovery process to identify one or more clouds in the set of host storage clouds 182 that may provide an optimized, best-available, and/or otherwise preferable, suitable, or satisfactory target storage site or resource for some or all of the data payload 184, on a permanent or comparatively long-term or other basis. At scheduled times, at user initiation, or at other times, the host placement engine 210 can begin the data placement selection and transport process by accessing the set of data hosting parameters 212, which can be stored in the data distribution service 172 and/or other local or remote storage, and reading or extracting the user's specified data storage parameters, factors, variables, and/or criteria for the storage of the data payload 184. For instance, the set of data hosting parameters 212 can indicate or encode any one or more of, merely for illustration, a data capacity specification, a data format specification, a data backup specification, a data loading time specification, a data security specification, a text data language specification, a storage cost specification, a specification of a duration of a storage subscription, a data management services specification, a data accessibility specification, a specification of a data expansion option, or a specification of software associated with the data payload. In the case for instance of data capacity, the set of data hosting parameters 212 can specify multiple parameters or attributes, such as for example a minimum data capacity, a maximum data capacity, an initial data capacity, a data capacity that begins with a minimum and/or maximum amount but which increases or decreases over time, and/or multiple capacity values or ratings for different types, sources, formats, files, data with different security ratings, and/or other discrete pieces or sections of data. In the case for instance of storage costs, the specification can be or include an overall or average cost (such as e.g. 30 cents per megabyte per month), and/or can include required or preferred costs that are expressed as a function of different capacities (such as e.g. 30 cents per megabyte for the first 1000 terabytes, 25 cents per megabyte for the next 500 terabytes, etc.), as a function of different hosting or subscription periods (such as e.g. 25 cents per megabyte for a 30 day hosting period, but 22 cents per megabyte for a 90 day storage commitment), and/or based on other parameters, variables, attributes, or criteria.

In aspects, the host placement engine 210 can apply the set of data hosting parameters 212 to the available capacities, costs, and/or other performance or configuration attributes of the set of host storage clouds 182, as reflected in a set of operational parameters 214 which inventories or lists the capacities, costs, and/or other operating factors of those potential target douds. In aspects, the host placement engine 210 can access and/or obtain some or all of the set of operational parameters 214 by interrogating the set of host storage clouds 182 via one or more host interrogation message 216, and/or other messaging or communication with the set of host storage clouds 182 and/or other site or service. The host placement engine 210 can transmit the one or more host interrogation message 216 to the set of host storage clouds on a scheduled basis, and/or can selectively transmit that message or others to the set of host storage clouds 182 at times selected by the user, and/or at other times. In aspects, the one or more host interrogation message 216 can be transmitted to all of the set of host storage clouds 182 on a collective basis, and/or can be transmitted to one or more selected clouds in the set of host storage clouds 182 on a selected or partial basis. In embodiments, some or all of the set of operational parameters 214 can in addition or instead be transmitted from some or all of the set of host storage clouds 182 on a push basis without receiving one or more host interrogation message 216, for instance at scheduled times or upon detection of a change in a subject cloud's set of operational parameters 214.

In aspects, the host placement engine 210 and/or other logic, application, or service can evaluate or apply the user's set of data hosting parameters 212 to the set of operational parameters 214 of the set of host storage clouds 182 to determine one or more clouds which may represent an optimal match, best-available match, minimum-threshold match, and/or other match for the placement of the user's data payload 184 and/or other data. In cases, a user may specify one parameter by which to identify or base the best-available or most-desired target host cloud or clouds upon overall evaluation, such as lowest total or absolute cost for the storage of a minimum amount of data for a specified hosting period. In other cases, the user may specify a joint or compound parameter or metric by which to select or identify an optimized or best-available storage target cloud or clouds, such as, for example, a lowest cost of storage on a per-megabyte basis while providing at least 99.98% data availability or uptime. Other factors, variables, parameters, attributes, and/or criteria can be indicated or used in the set of data hosting parameters 212.

Figure 7:
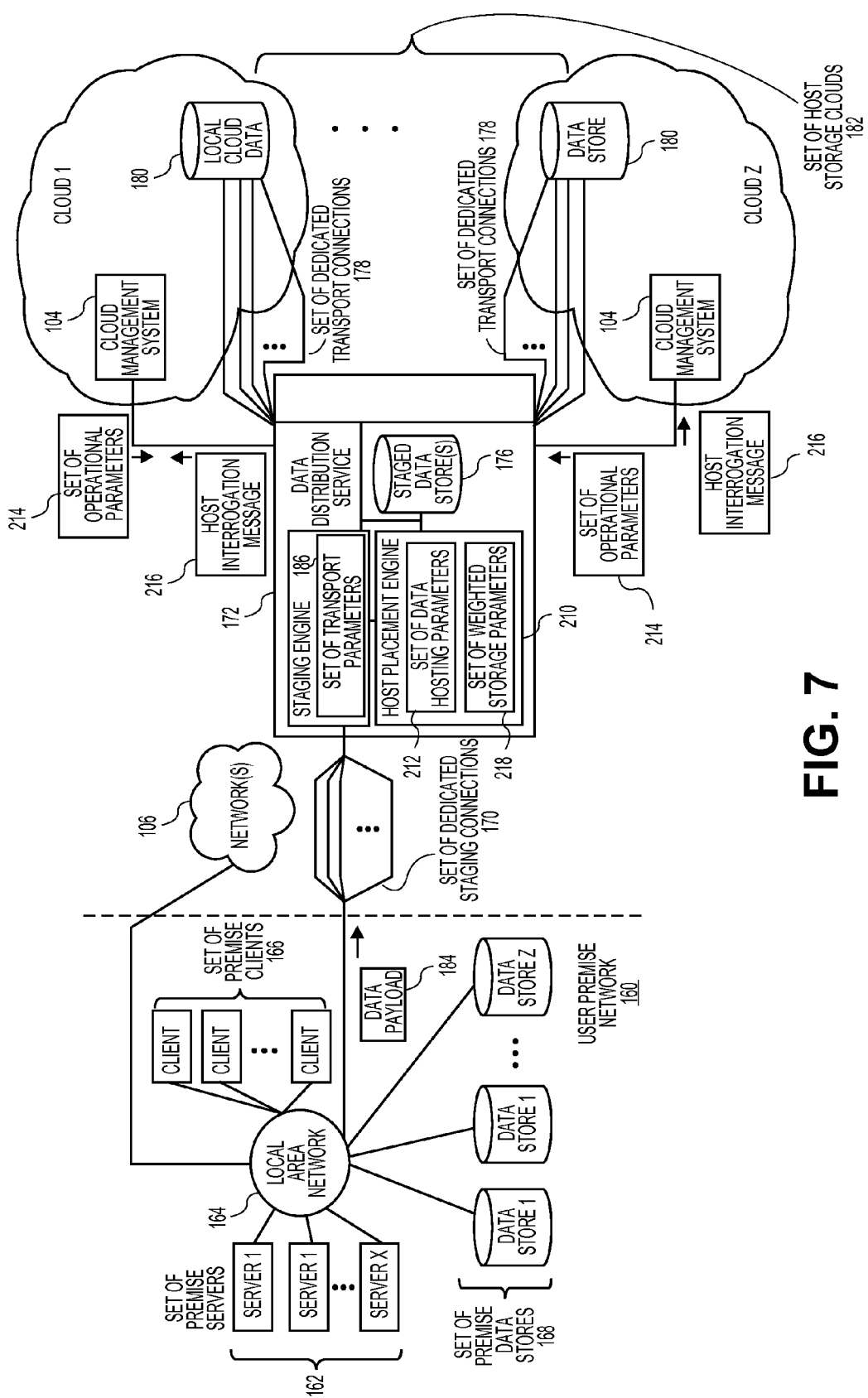
FIG. 7 illustrates an exemplary set of data hosting parameters and other user-supplied, cloud-operational, and other data that can be processed in systems and methods for generating an optimized host placement of a data payload in a cloud-based storage network, according to aspects.
Figure 8:
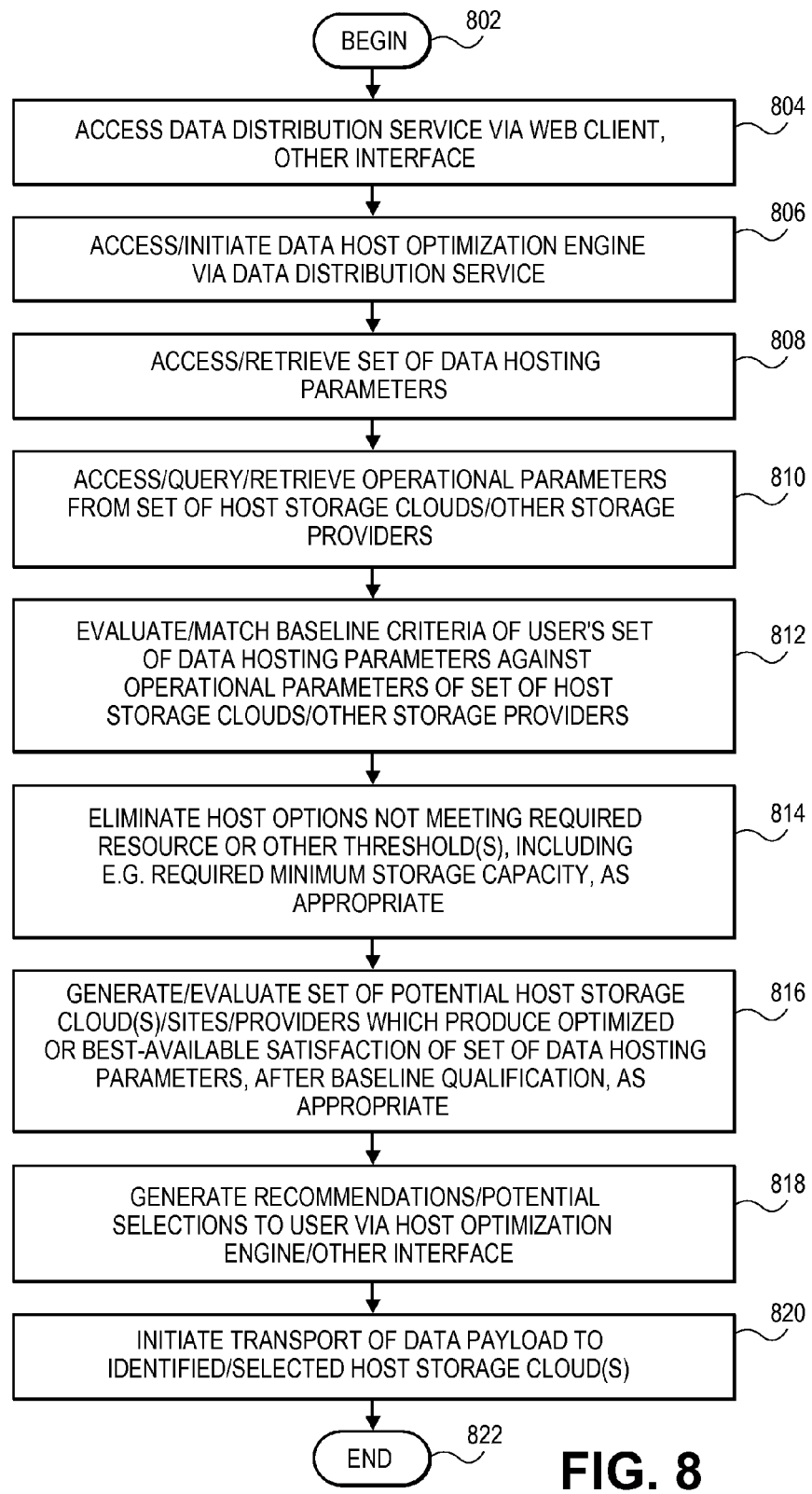
FIG. 8 illustrates a flowchart of the processing of operational parameters of potential host storage clouds, in systems and methods for generating an optimized host placement of a data payload in a cloud-based storage network, according to various regards.

In aspects, and as for instance shown in FIG. 7, the user can, if desired, specify or encode a set of weighted storage preferences 218 as part of the set of data hosting parameters 212. In aspects, for example, and as shown, the user can specify a weight of 1.0 to minimum capacity requirements, a weight of 0.9 to subscription costs, a weight of 0.8 to security services or ratings, a weight of 0.6 for regulatory compliance options, and so forth. In cases where a set of weighted storage preferences 218 are provided or used, those weights, values, functions, and/or other factors can be applied to the set of operational parameters 214 of the set of host storage clouds 182 to generate or arrive at a composite or combined score, rating or ranking of those potential storage hosts. In aspects, the composite weighted sum and/or other metric generated using the set of weighted storage preferences 218 can be used to develop a list or ordered set of potential storage clouds and/or cloud providers to receive and host the data payload 184 and/or other data. The list or set, when generated, can for instance be presented to the user via a graphical list or interface, to permit the user to review and/or select the desired cloud or clouds for data storage. When selected via a weighted list, and/or by other techniques, the host placement engine 210 can initiate the transport of the data payload 184 from the data distribution service 172 to the selected host storage clouds, for instance using the set of dedicated transport connections 178 and/or other resources or techniques described herein, or others.

FIG. 7 illustrates the evaluation, weighting, selection, and other processing that can be used in systems and methods for generating an optimized host placement of a data payload in a cloud-based storage network, in the identification of one or more target storage hosts for the placement and mounting of the data payload 184 and/or other source or subject data. In 702, processing can begin. In 704, the data distribution service 172 can be accessed for instance via a Web client operating on a client machine, for instance in set of clients 166, and/or via other machines, channels, connections, or interfaces. The data distribution service 172 can be accessed or logged into by a user operating a client or other machine or interface, or can in embodiments be accessed automatically via a software application, service, and/or other automated technique.

In 706, the host placement engine 210 can be accessed and/or initiated via the data distribution service 172 and/or other connection or service. For instance, the data distribution service 172 can call or invoke the host placement engine 210 via a service, application programming interface (API), operating system or related software, and/or other interfaces, channels, or connections. In 708, the set of data hosting parameters 212 can be accessed, read, and/or retrieved via the host placement engine 210 and/or other logic, application, and/or service. The set of data hosting parameters 212 can for instance be stored in, and accessed from, local storage in the data distribution service 172, and/or from other local or remote data stores. In 710, the host placement engine 210 can access, interrogate, query, and/or receive or retrieve the set of operational parameters 214 from the set of host storage clouds 182 and/or other storage sites, providers, and/or services. In aspects, the host placement engine 210 can transmit a command, query, message, and/or other transmission to one or more of the clouds in the set of host storage clouds 182 to request a response or inventory of each of those clouds' operational parameters. The set of operational parameters 214 can be or include, for instance, the storage capacity available in each cloud, including anticipated or scheduled changes in available capacities over time. The set of operational parameters 214 can also be or include subscription or hosting costs for receiving, storing, mounting, and/or maintaining the data payload 184 in each cloud. The set of operational parameters 214 can also be or include data availability specifications, such as rated uptimes or availability of the hosted data to users or services wishing to access that data, as well as failover features or data mirroring or backup options. The set of operational parameters 214 can also be or include data security features, ratings, and/or specifications, such as the degree, type, level, and/or standards used for data security, such as types of data encryption, authentication, and/or other security features. Security features can include specifications for various security, encryption, or authentication services, such as, merely for example, Kerebos, RSA, SSL (secure socket layer), public/private key encryption, and/or other security types, standards, and/or specifications. The operational parameters can likewise be or include specifications regarding data access to the data payload 184 hosted in the set of host storage clouds 182, such as the name, address, or type of Web sites or interfaces used to access the hosted data, the username/password scheme to be used for that access, the types or nature of administrative privileges provided to identified administrators, and/or other configuration or specification details related to the hosting and maintenance of the data payload 184 in the set of host storage clouds 182.

In 712, the host placement engine 210 and/or other logic, application, site, and/or service can evaluate, analyze, and/or match one or more selected or baseline criteria reflected in the user's set of data hosting parameters 212 against the set of operational parameters 214 of each cloud or cloud provider in the set of host storage clouds 182, and/or other potential host or storage providers. The host placement engine 210 and/or other logic, application, site, and/or service can for instance search for or identify those host clouds and/or cloud providers whose reported set of operational parameters 214 include a storage hosting capacity of, merely for instance, 200 terabytes for the first 30 days of storage, in cases where the user's set of data hosting parameters 212 require a minimum of 200 terabytes over that subscription or storage period. The host placement engine 210 and/or other logic, application, site, and/or service can for instance search for those host clouds and/or cloud providers whose reported set of operational parameters 214 include a data uptime or availability rating of, merely for instance, 99.99% at all hosted times, in cases where the user's set of data hosting parameters 212 require a minimum of 99.99% availability for all hosted or subscription periods. Other parameters or specifications can be used to reflect, encode, or represent one or more minimum or baseline requirements encapsulated in the set of data hosting parameters 212.

In 714, host placement engine 210 and/or other logic, application, site, and/or service can eliminate, discard, and/or discount those clouds and/or cloud providers whose set of operational parameters 214 do not meet one or more required resource or operational threshold or thresholds, including for instance minimum storage capacity, as appropriate. Thus for instance, the host placement engine 210 and/or other logic, application, site, and/or service can eliminate those clouds and/or cloud providers whose set of operational parameters 214 do not include or do not permit them to offer or provide the aforementioned 200 terabytes of data storage for the first 30 days of the hosted storage. Other parameters or specifications, singly or together, can be examined to determine or identify those clouds or cloud providers whose resources or capacities do not meet one or more requirements or aspects of the user's set of data hosting parameters 212, as appropriate.

In 716, the host placement engine 210 and/or other logic, application, site, and/or service can generate, evaluate, calculate, discover, and/or identify the set of potential host clouds in the host storage clouds 182 which provide or produce an optimized or best-available match or satisfaction of the set of data hosting parameters 212, after the baseline or preliminary qualification of those clouds or providers remaining after 714, as appropriate. In cases where the user has specified one variable or parameter as the key, overriding, or predominant desired feature or specification, the host cloud, clouds, and/or providers whose set of operational parameters 214 provide the highest rated value for that variable can be identified as the optimized or best-available cloud or provider to host the data payload 184. For instance, for a user whose data hosting needs involve critical or sensitive data, data availability ratings may represent the single most important factor in selected a host storage cloud, and so the cloud or provider offering the highest-rated data availability specification, such as for example, 99.9999% amongst the set of host storage clouds 182 where no other cloud or provider can offer more than 99.9980%, may be identified or selected based on that critical or key factor. In other cases, the user may specify in their set of data hosting parameters 212 or otherwise that subscription, hosting, and/or related costs may represent the most important or determinative variable for that users data hosting needs, and so the cloud and/or provider offering the lowest cost hosting package may be selected based on that factor, assuming all other minimum requirements are met. Other factors, parameters, settings, and/or configuration values can be used to selected an optimized or best-available cloud, clouds, and/or cloud providers to host the data payload 184 and/or other data.

In aspects, the user may specify that host storage targets may be identified or selected based on more than one variable, parameter, or factor, and/or may indicate or supply a weight, ranking, or rating to be applied to different ones of those variables, and/or combinations thereof. Thus for instance, a user may specify that they require a minimum of 300 terabytes storage capacity a month, for which they are willing to pay a subscription cost of 15 cents per megabyte per month. The same user may also specify, however, that they would prefer an option of a continuously available or hot backup of the 300 terabytes of data, for which option they would be willing to pay a subscription cost of 18 cents per megabyte per month, and would likewise prefer an option of a selected or preferred piece of database middleware to be made available to network users, at a cost of 10 cents per instance if available. That user may assign a weight, ranking, or value of 1.0 to the 300 terabyte storage capacity, a weight of 0.9 for continuous backup capability, a weight of 0.6 for the preferred database middleware. In such cases, different clouds or cloud providers in the set of host storage clouds 182 may be able to provide or partially provide different combinations of the user's set of data hosting parameters 212, in which case, the host placement engine 210 and/or other logic, application, site, and/or service can compute a total weighted value of each cloud or provider's offering based on a weighted sum of the various factors or parameters. In such cases, the cloud or provider offering the combination of resources or parameters having the highest total of the weighted sum can be selected or identified as the optimized or best-available host storage cloud or provider. In further cases, no one cloud or cloud provider may be able to provider all desired resources or service levels, in which as the host placement engine 210 and/or other logic, application, site, and/or service can, for example, provider the user with a list of clouds or providers which can provide a set of operational parameters 214 partially satisfying the user's storage requirements, and for example permit the user to selected among the available cloud or provider options. Other reports, results, recommendations, and/or selections can be made, and can, for instance, be delivered or presented to the user via a graphical dialog, such as via a browser or other interface.

In 718, the host placement engine 210 and/or other logic, application, site, and/or service can generate a recommendation and/or a set of potential selections and present the identified or alternative cloud or clouds, and/or cloud providers, to present to the user via the host placement engine 210 and/or other service or interface. In embodiments, the host placement engine 210 can also or instead be configured to automatically select the target cloud in the set of host storage clouds 182 to host the data payload 184 and/or other data based on the set of data hosting parameters 212 and/or other criteria. In 702, the host placement engine 210 and/or other logic, application, site, or service can initiate the transport of the data payload 184 to the identified and/or selected host storage cloud or clouds in the set of host storage clouds 182, for instance by invoking transport services of the data distribution service 172. In 722, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
receiving, by a processor associated with a data distribution service, an identification of a data payload to be transported from the data distribution service to a plurality of host storage clouds;
accessing a plurality of data hosting parameters, wherein the plurality of data hosting parameters comprise a specification to host the data payload in the plurality of host storage clouds;
interrogating the plurality of host storage clouds to receive a plurality of operational parameters for the plurality of host storage clouds;
evaluating, by the processor, the plurality of operational parameters against the plurality of data hosting parameters, wherein evaluating the plurality of operational parameters comprises identifying an optimized match between the plurality of data hosting parameters and the plurality of operational parameters, and wherein identifying the optimized match comprises calculating a matching score between the plurality of data hosting parameters and the plurality of operational parameters in view of a plurality of weights associated with at least one data hosting parameter of the plurality of data hosting parameters; and
selecting, by the processor, a target storage cloud from among the plurality of host storage clouds in view of the evaluating of the plurality of operational parameters for the plurality of host storage clouds.

2. The method of claim 1, wherein the plurality of data hosting parameters comprises at least one of a data capacity specification, a data format specification, a data backup specification, a data loading time specification, a data security specification, a text data language specification, a storage cost specification, a duration of a storage subscription, a data management services specification, a data accessibility specification, a data expansion option, or a specification of software associated with the data payload.

3. The method of claim 1, wherein the plurality of operational parameters comprises at least one of a storage capacity rating, a storage availability rating, a storage backup configuration, a storage cost schedule, a storage maintenance schedule, a storage format configuration, a storage host subscription schedule, a storage text language configuration, or a storage security rating.

4. The method of claim 1, wherein the data payload comprises data retrieved from a premise network to the data distribution service.

5. The method of claim 1, further comprising initiating a transfer of the data payload to the target storage cloud.

6. The method of claim 1, wherein evaluating the plurality of operational parameters for the plurality of host storage clouds against the plurality of data hosting parameters comprises identifying a match between the plurality of data hosting parameters and the plurality of operational parameters to satisfy a minimum match threshold.

7. The method of claim 6, wherein evaluating the plurality of operational parameters for the plurality of host storage clouds against the plurality of data hosting parameters comprises identifying a best-available match between the plurality of data hosting parameters and the plurality of operational parameters.

8. The method of claim 1, wherein the target storage cloud comprises a plurality of target storage clouds.

9. The method of claim 8, further comprising generating a ranking of the plurality of target storage clouds in view of the matching score.

10. The method of claim 8, wherein the data payload is stored in one of the plurality of target storage clouds.

11. The method of claim 8, wherein the data payload is stored in two or more of the plurality of target storage clouds.

12. A system, comprising:
an interface to a data distribution service hosting a data payload stored in a plurality of staged data stores; and
a processor, associated with the data distribution service via the interface, the processor to:
receive an identification of the data payload to be transported from the data distribution service to a plurality of host storage clouds;
access a plurality of data hosting parameters, wherein the plurality of data hosting parameters comprise a specification to host f the data payload in the plurality of host storage clouds;
interrogate the plurality of host storage clouds to receive a plurality of operational parameters for the plurality of host storage clouds;
evaluate the plurality of operational parameters against the plurality of data hosting parameters,
wherein to evaluate, the processor is further to identify an optimized match between the plurality of data hosting parameters and the plurality of operational parameters, and wherein to identify,
the processor is further to calculate a matching score between the plurality of data hosting parameters and the plurality of operational parameters in view of a plurality of weights associated with at least one data hosting parameter of the plurality of data hosting parameters; and
select a target storage cloud from among the plurality of host storage clouds in view of the evaluating of the plurality of operational parameters for the plurality of host storage clouds.

13. The system of claim 12, wherein the data payload comprises data retrieved from a premise network to the data distribution service.

14. The system of claim 12, wherein the processor further to initiate a transfer of the data payload to the target storage cloud.

15. The system of claim 12, wherein to evaluate the plurality of operational parameters for the plurality of host storage clouds against the plurality of data hosting parameters, the processor is further to identify a match between the plurality of data hosting parameters and the plurality of operational parameters to satisfy a minimum match threshold.

16. The system of claim 15, wherein to evaluate the plurality of operational parameters for the plurality of host storage clouds against the plurality of data hosting parameters, the processor is further to identify a best-available match between the plurality of data hosting parameters and the plurality of operational parameters.

17. The system of claim 12, wherein the target storage cloud comprises a plurality of target storage clouds.

18. The method of claim 1 further comprising specifying, by the processor, a plurality of transport parameters to govern the transport of the data payload during delivery to one of the data distribution service or the plurality of host storage clouds.

* * * * *